United States Patent [19]

Scullard

[11] 3,772,014

[45] Nov. 13, 1973

[54] POLYMERS CONTAINING RESORCINOL GROUPS AND PHOTOGRAPHIC ELEMENTS CONTAINING SAME

[75] Inventor: Peter William Scullard, Webster, N.Y.

[73] Assignee: Eastman Kodak Company, Rochester, N.Y.

[22] Filed: Sept. 16, 1971

[21] Appl. No.: 181,261

[52] U.S. Cl............................ 96/29 D, 96/3, 96/109, 260/17.2
[51] Int. Cl. ........ G03c 5/54, G03c 7/00, G03c 1/34
[58] Field of Search........................ 96/29 D, 3, 109

[56] References Cited
UNITED STATES PATENTS
3,598,599    8/1971    Tuites et al. ........................... 96/109

*Primary Examiner*—Norman G. Torchin
*Assistant Examiner*—Alfonso T. Suro Pico
*Attorney*—Robert W. Hampton et al.

[57] ABSTRACT

Polymers comprising units having resorcinol groups appended thereto are disclosed along with processes for preparing same. In one embodiment, the polymers are water-soluble polymers or latex polymers. In another embodiment, the polymers of this invention are very effective in providing improved image characteristics in photographic elements, especially in color photographic elements where the polymers are very effective in scavenging color developers.

15 Claims, No Drawings

POLYMERS CONTAINING RESORCINOL GROUPS AND PHOTOGRAPHIC ELEMENTS CONTAINING SAME

This invention relates to new monomers, polymers, photographic elements and processes for forming images in photographic elements. In one aspect, this invention relates to polymeric compounds containing resorcinol groups appended thereto, and preferably to those polymers which are latexes or are water-soluble. In another aspect, this invention relates to photographic elements which have improved resistance to environmental effects, background stain, etc. In still another aspect, this invention relates to improved image transfer systems.

It is known in the art to add various scavenger compounds to photographic elements to retard certain reactions of the left-over developers, by-products of the development reactions, atmospheric contaminants and the like. Certain hydroxybenzene compounds are shown in U.S. Pat. Nos. 2,336,327, 2,403,721, 2,728,659 and 2,360,290 to prevent color stain in photographic elements. U.S. Pat. Nos. 3,459,548, 3,287,126 and 3,482,971 disclose scavengers for oxidized developing agents. Polymeric compounds containing appended polyhydroxybenzene groups, such as hydroquinone groups, have been suggested for use to control stain in U.S. Pat. Nos. 2,710,801 and 2,816,028. However, many of the additives used as scavengers acted as a redox agent, especially in the case of scavenging oxidized developers, and reduced the oxidized developing agent. Also, many of the so-called antistain agents were silver halide developers which could enter in competing reactions with color developing agents. Therefore, improved additives are desirable to provide improved photographic systems, for example, additives with higher effectiveness per a weight unit which will reduce bulk in a photographic element structure, additives which can be coated from aqueous solutions, additives which are more effective in scavenging oxidized developer, and the like.

I have now found that polymeric compounds containing resorcinol groups attached thereto can be used in photographic elements or in photographic processes to provide improved image qualities and aging properties in the image record. In a preferred embodiment, the polymeric compounds are latex polymers or water-soluble polymers which can be coated from an aqueous medium. The latex or water-soluble polymeric compounds offer simplicity in coating while providing a relatively nondiffusing scavenger which can be confined to a specific location in the photographic element.

These polymers can be incorporated in multilayer photographic elements without the need for high-boiling solvents, they can be a partial replacement for coating vehicles, they have lower equivalent weight than corresponding ballasted monomeric scavengers, and the like. When color developers such as aromatic primary amines are used in the development reaction, the polymeric scavengers appear to scavenge the excess developer which may provide discoloration upon aerial oxidation or extraneous oxidation. In some systems, the scavengers are also effective in scavenging unreacted compounds such as aldehydes.

While the exact mechanism of the scavenging reaction is not known, it is believed that the resorcinol-containing polymers of this invention react with compounds such as an oxidized developer to form covalent bonds therewith, such as by a coupling reaction, thereby to immobilize the oxidized developer. Moreover, the resorcinol-containing polymers of this invention are not silver halide developing compositions and, thus, can be put in any desired layer of the photographic element since they will not compete with the developing agents or reactivate oxidized developing agents.

The improvements in image stability with the compounds of this invention are believed to offer a definite advance in the art; the closely related monohydroxy compounds and the polyhydroxy compounds wherein the hydroxy groups are not in 1,3-position do not appear to offer the same improvements when used at similar weight percentage concentrations. Moreover, the present resorcinol-containing polymers can generally be incorporated in hydrophilic colloid layers since they are water-dispersable such as the latexes or have sufficient water solubility to obtain an adequate amount of polymer in solution.

Generally, the polymers of this invention comprise recurring units having resorcinol groups appended thereto. Preferably, the resorcinol groups have hydroxy substituents in the 1- and 3-positions and are appended to the polymeric chain through the 5-position. The polymers of this invention generally have an equivalent weight with respect to resorcinol groups of less than 2000 and preferably less than 500, and comprise at least 4 and preferably more than 10 recurring units.

In one highly preferred embodiment, the polymers are water-soluble copolymers or latex copolymers. The water-soluble copolymers comprise units containing the resorcinol groups in copolymerized relationship with units containing water-solubilizing groups thereon with the ratio of units containing water-solubilizing groups thereon being high enough to provide a sufficient degree of solubility to the polymer to form polymeric solutions. The latex copolymers contain units containing the resorcinol groups thereon and are either 1) in copolymerized relationship with units having water-solubilizing groups in a ratio sufficient to provide sufficient water solubility to make an aqueous latex dispersion or 2) polymerized in the presence of surfactants by procedures which will provide an aqueous latex dispersion.

In another embodiment, the polymers of this invention are ethenic or vinyl polymers comprising recurring units having the polymeric backbone:

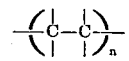

wherein at least a portion of said units contain resorcinol groups appended thereto, either directly or through a divalent organic group such as, for example, units of an acrylamide, acrylate and the like, which have a resorcinol group substituted thereon. Preferably, the polymers contain units represented by the formula:

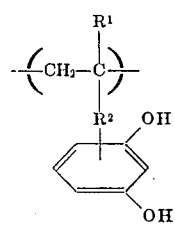

wherein R¹ can be a hydrogen atom or an alkyl group containing 1 to 4 carbon atoms and is preferably a hydrogen atom or a methyl group; R² is a divalent organic group containing from 1 to 8 carbon atoms in the linking chain and preferably is a divalent group of the formulas:

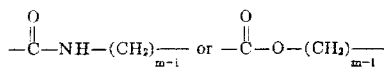

wherein m is a positive integer of 1 to 4 and is preferably 1. The above structures preferably have the hydroxy substituents in the 1- and 3-positions and are connected through the divalent organic group in the 5-position. Preferably, the polymers of this invention are copolymers comprising units as represented above in copolymerized relationship with units of other ethylenically unsaturated monomers.

In one preferred embodiment, the resorcinol-containing polymers are present in a photographic element which is processed with a color developing agent.

In another embodiment, the resorcinol-containing polymers are present in photographic elements in combination with color-forming couplers to scavenge oxidized color developer which does not react with the color coupler.

In another embodiment, the scavengers of this invention are coated in a photographic silver halide element or an image-receiving sheet at a concentration of about 1 mg. to about 500 mg., and preferably 5 mg. to 100 mg./ft.

In another embodiment, we have found that polymers according to this invention can be incorporated in a photographic element to incapacitate effectively any excess color developer by forming a colorless reaction product, thereby eliminating the need for a pigmented masking layer.

In another embodiment, the scavengers of this invention are used in combination with a timing means so that development in the photosensitive element is substantially complete before the scavenger is effectively associated with the development medium.

In one preferred embodiment, the scavengers of this invention are used in combination with color transfer units, and preferably those transfer units wherein the dye image-receiving layer is integral with the photosensitive element itself or is provided on a separate support to be superposed on the photosensitive element after exposure thereof. In one embodiment, elements of this type comprise a film unit which is adapted to be processed by passing the unit between a pair of juxtaposed pressure-applying members, such as would be found in a camera designed for in-camera processing, comprising:

a. a photosensitive element comprising a support having thereon at least one and preferably three photosensitive silver halide emulsion layers, each silver halide emulsion layer having associated therewith a dye imageproviding material comprising a nondiffusible coupler capable of reacting with oxidized aromatic primary amino color developing agent to produce a diffusible dye;

b. a dye image-receiving layer; and c. a rupturable container containing an alkaline processing composition and which is adapted to be positioned during processing of the film unit so that a compressive force applied to the container by the pressureapplying members will effect a discharge of the container's contents within the film unit;

the above film unit containing an aromatic primary amino color developing agent, preferably in the rupturable container, and a resorcinol-containing polymer in a polymeric binder which is capable of reacting with unused aromatic primary amino color developing agent to form a colorless or substantially colorless reaction product.

The water-soluble or latex resorcinol-containing polymers of this invention generally do not require the use of an organic solvent to achieve a uniform dispersion in a hydrophilic colloid layer of a photographic element. However, low-boiling-point organic solvents having a boiling point of less than 100° C., such as acetone, ethyl acetate and the like, can be used in achieving uniform dispersions of the present scavengers, if desired. While high-boiling-point organic solvents, such as coupler solvents, can be used to obtain dispersions, they are generally not employed since much thicker layers are required when coating this type of dispersion. The resorcinol-containing polymers can generally be incorporated in photographic elements by any of the techniques employed in the art for dispersing materials of this type which are water-soluble or form latex dispersions in water. The resorcinol-containing polymers can be employed in any concentration useful for the intended purpose. However, generally lower weight percentages of the present resorcinol-containing polymers are required to provide an effective scavenging as compared with other compounds used in the prior art for this purpose. I have found that concentrations of from 1 mg. per square foot to about 500 mg. per square foot, and preferably from about 5 mg. to 100 mg. per square foot, can be used for most purposes.

The resorcinol-containing polymers can generally be located in any layer of a photographic element (including imagereceiving sheets). In certain embodiments where the polymer contains components which make it flexible, the polymer can be coated as a layer without any carrier vehicle or binder and will provide a suitable layer which will not crack or craze in use. In other embodiments, resorcinol-containing polymers can be incorporated in vehicles used in coating photographic elements including, for example, proteins, cellulose derivatives, polysaccharides, synthetic polymeric substances and the like. In certain embodiments, the resorcinol-containing polymers are incorporated in hydrophilic, water-permeable colloids, or synthetic polymeric compounds such as dispersed vinyl compounds such as in latex form and particularly those which increase the dimensional stability of the photographic materials. Suitable synthetic polymers include those described, for example, in U.S. Pat. Nos. 3,142,568 by Nottorf issued July 28, 1964; 3,193,386 by White issued July 6, 1965; 3,062,674 by Houck et al, issued Nov. 6, 1962; 3,220,844 by Houck et al, issued Nov. 30, 1965; 3,287,289 by Ream et al, issued Nov. 22, 1966; and 3,411,911 by Dykstra issued Nov. 19, 1968. Particularly effective are those water-insoluble polymers of alkyl acrylates and methacrylates, acrylic acid, sulfoalkyl acrylates or methacrylates, those which have cross-linking sites which facilitate hardening or curing described in Smith, U.S. Pat. No. 3,488,708 issued Jan. 6, 1970, and those having recurring sulfobetaine units as described in Dykstra, Canadian Pat. No. 774,054.

The term "nondiffusing" used herein has the meaning commonly applied to the term in color photography and denotes materials which for all practical purposes do not migrate or wander through organic colloid layers, such as gelatin, comprising the sensitive elements of the invention. The same meaning is to be attached to the term "immobile."

The term "diffusible" has the converse meaning and denotes materials having the property of diffusing effectively through the colloid layers of the photographic elements, and generally refers to materials which can migrate to any layer of the element during aqueous treatment. "Mobile" has the same meaning.

The scavengers of this invention can be used in any photographic element where it is desired to immobilize or scavenge an unwanted reaction product or contaminant. In one embodiment, they are used effectively in black-and-white or color photographic products to scavenge unwanted aldehydes. In another embodiment, the resorcinol-containing polymers are especially useful in color photographic elements which employ a color silver halide developer during processing.

The term "color developer" is understood to refer to that class of compounds known in the art as color silver halide developers, and generally refers to silver halide developers which in their oxidized form will couple with a color-forming coupler. Generally, these developers are aryl compounds having at least one -$NH_2$ group thereon.

In a highly preferred embodiment of my invention, the resorcinol-containing polymers are used in image transfer systems including those transfer systems wherein the image-receiving layer remains integral with the photosensitive emulsion, as well as those where the image-receiving layer is separated from the photosensitive layers.

In one embodiment of my invention wherein the imagereceiving element is separate from the photosensitive element, the novel dye image-receiving element comprises a support having thereon the following layers:

a. a scavenger layer comprising a resorcinol-containing polymer and
b. a dye image-receiving layer.

A timing layer, described hereinafter, can also be employed in the invention between the scavenging layer and the dye image-receiving layer which functions to delay the rate of diffusion of aromatic primary amino color developing agent into the scavenging layer. The timing layer, therefore, ensures the efficient use of the aromatic primary amino color developing agent in the photosensitive element prior to scavenging action by the resorcinol-containing polymer. A pH-lowering material, described hereinafter, can also be employed in the dye image-receiving element to increase the stability of the transferred image. Although not required, a light-reflective layer comprising a white pigment in a binder, described hereinafter, can also be employed in the dye image-receiving element, if desired. The light-reflective layer can be located underneath the dye image-receiving layer or can be combined with the timing layer if one is employed.

The above-described dye image-receiving element of the film unit is adapted to be superposed on the photosensitive element after exposure thereof. The development and transfer operations can be effected by bathing either or both the exposed photosensitive element and the dye image-receiving element in a developing solution before rolling into contact with each other, or a viscous developing composition can be placed between the elements for spreading in a predetermined amount across and into contact with the exposed surface of the photosensitive element. The viscous developing composition is desirably utilized in one or more pods attached to the reception sheet or photosensitive element that can be readily ruptured when development is desired as described, for example, in U.S. Pat. Nos. 2,559,643, 2,647,049, 2,661,293, 2,698,244, 2,698,798 and 2,774,668.

During the development phase of a color diffusion transfer process according to my invention, the image dyes formed in the respective blue-, green- and red-sensitive silver halide emulsion layers diffuse out of the photosensitive element through the viscous developer composition and into the dye image-receiving layer, e.g., into the dye image-receiving element described above, where the dyes are mordanted to form the transferred image. The timing layer, if one is present, prevents the diffusion of color developer into the scavenger layer for the time necessary to ensure the efficient use of the aromatic primary amino color developing agent in the photosensitive element. Upon separation, it is believed that the unused aromatic primary amino color developing agent diffuses into the scavenger layer where the developer molecules can react with the resorcinol-containing polymer under alkaline conditions of development to form a colorless or substantially colorless reaction product. Regardless of the mechanism involved, a marked decrease in the yellowish-brown stain caused by the presence of unused color developing agent in color development diffusion transfer image-receiving elements is observed upon utilizing a scavenger layer comprising a resorcinol-containing polymer in a suitable binder, preferably in the image-receiving element.

In another embodiment of my invention, the scavenger layer can be located in an integral film unit wherein the dye image-receiving layer is located integral with the photosensitive element between the support and the lowermost photosensitive silver halide emulsion layer. Such integral receiver-negative photosensitive elements are described in copending U.S. application Ser. No. 115,459 of Barr et al, filed Feb. 16, 1971 (now abandoned). In such an embodiment, the support for the photosensitive element is transparent and is coated with the dye image-receiving layer, a substantially opaque, light-reflective layer, e.g., $TiO_2$, a scavenger layer comprising a resorcinol-containing polymer dispersed in a suitable binder, and the various layers forming the color-forming units. After exposure of the photosensitive element, a rupturable container containing an alkaline processing composition and an opaque process sheet are brought into superposed position. Pressure-applying members in a camera rupture the container and spread processing composition over the photosensitive element as the film unit is withdrawn from the camera. The processing composition develops the exposed silver halide layers and dye images are formed as a function of development which diffuse to the image-receiving layer to provide a positive, right-reading image which is viewed through the transparent support on the opaque reflecting layer background. It is believed that positioning of the scavenger layer between the color-forming photosensitive units and the image-receiving layer in the integral receiver-negative film system prevents the diffusion of unused color developer into the image-receiving layer. If desired, an auxiliary scavenger layer comprising the scavenging materials described herein can be located on the opaque process sheet. For further details concerning this particular integral film unit, its preparation and use, reference is made to the above-mentioned U.S. application Ser. No. 115,459 of Barr et al filed Feb. 16, 1971, which is incorporated herein by reference.

Another embodiment of integral receiver-negative photosensitive systems in which my invention can be employed is described in Cole, U.S. Ser. No. 115,552 filed Feb. 16, 1971 (now abandoned). In such an embodiment, the support for the color diffusion transfer system is transparent and is coated with the image-receiving layer, a substantially opaque, light-reflective layer, e.g., $TiO_2$, a scavenger layer comprising a resorcinol-containing polymer dispersed in a suitable binder, and then the various layers forming the color-forming units and a top transparent sheet. A rupturable container containing an alkaline processing composition and an opacifier is positioned adjacent to the top layer and sheet. The film unit is placed in a camera, exposed through the top transparent sheet and then passed between a pair of pressure-applying members in the camera as it is being removed therefrom. The pressure-applying members rupture the container and spread processing composition and opacifier over the negative portion of the film unit to render it light-insensitive. The processing composition develops the exposed silver halide layers and dye images are formed as a result of development which diffuse to the image-receiving layer to provide a positive, right-reading image which is viewed through the transparent support on the opaque reflecting layer background. Any unused aromatic primary amino color developing agent which may diffuse in the direction of the image-receiving layer is immobilized by the resorcinol-containing polymer present in the scavenger layer. Any undesirable products formed in the scavenger layer are masked from the viewer by the opaque light-reflective layer. For further details concerning this particular integral film unit, its preparation and use, reference is made to the above-mentioned Cole, U.S. application Ser. No. 115,552 filed Feb. 16, 1971, which is incorporated herein by reference.

Very good results are obtained when the resorcinol-containing polymers are used in the photographic film units where there is associated with each silver halide emulsion layer in the photosensitive element a dye image-providing material comprising a nondiffusible coupler which produces a diffusible dye on reaction with oxidized aromatic primary amino color developing agent in an alkaline processing composition.

Typical preferred image transfer systems of this type are disclosed in U.S. Pat. Nos. 3,227,550 and 3,227,552 and British Pat. No. 904,364 at page 19, which are all incorporated herein by reference. The resorcinol-containing polymers are also useful in other systems wherein a color developing agent is employed, such as disclosed in U.S. Pat. Nos. 3,227,551, 2,559,643, 3,443,940, 3,443,939 and the like.

Inert timing or spacer layers referred to above can be employed in photographic elements of my invention. Generally, they are employed between the scavenger layer and a dye image-receiving layer which "times" or controls the scavenging reaction as a function of the rate at which alkali diffuses through the inert spacer layer. Examples of such timing layers include gelatin, polyvinyl alcohol or any of those disclosed in U.S. Pat. No. 3,455,686. The timing layer is also effective in evening out the various reaction rates over a wide range of temperatures, e.g., premature pH reduction is prevented when imbibition is effected at temperatures above room temperature, for example, at 95° to 100° F. The timing layer is usually about 0.1 to about 0.7 mil in thickness. Especially good results are obtained when the timing layer comprises a hydrolyzable polymer or a mixture of such polymers which are slowly hydrolyzed by the processing composition. Examples of such hydrolyzable polymers include polyvinyl acetate, polyamides, celluslose esters, etc.

The invention can be further illustrated by the following examples.

EXAMPLE 1:

A. Preparation of 5-aminoresorcinol

Phloroglucinol dihydrate, 200 g., is added to 1 liter of concentrate ammonium hydroxide which has been flushed with nitrogen. The mixture is stirred and heated in a nitrogen atmosphere until all the phloroglucinol dissolves. The solution is cooled to room temperature and stirred for 16 hours. The solution is concentrated in a vacuum. The resulting precipitate is collected and the filtrate is concentrated under vacuum. The precipitate is collected, combined with the initial precipitate and dried. The solid is slurried with ethyl acetate, warmed, cooled, filtered and dried, to give 121 g. of 5-aminoresorcinol.

B. Preparation of 5-acrylamidoresorcinol

To 1.5 liters of tetrahydrofuran are added 98 cc. (.77 mole) N,N-dimethylaniline and 84 g. (.67 mole) 5-aminoresorcinol. The solution is stirred and cooled to 0° C. To the cold stirred solution are added dropwise 54 cc. (.67 mole) acryloyl chloride dissolved in 100 cc. tetrahydrofuran. The solution is allowed to warm to 25° and is stirred for 16 hours. The solution is concentrated under vacuum to leave a thick dark oil. The oil is slurried with 700 cc. dilute hydrochloric acid containing 50 g. NaCl and extracted with 2 liters of ethyl acetate. The ethyl acetate is dried and evaporated to give after recrystallization 56 g. of 5-acrylamidoresorcinol.

C. Preparation of copoly(5-acrylamidoresorcinol—sodium methacryloyloxyethyl sulfate)

In 800 cc. dimethyl formamide are dissolved 35.6 g. (0.2 mole) of 5-acrylamidoresorcinol and 46.4 g. (0.2 mole) of sodium methacryloyloxyethyl sulfate. The solution is warmed under nitrogen to 60° C. for 20 minutes with stirring. A solution of 2.0 g. of 2,2′-azobis[2-methylpropionitrile] in 50 cc. dimethyl formamide is added to the solution of monomers.

The solution is stirred under nitrogen at 60° C. for 6 hours. The solution is filtered and poured into ether. The resulting product is titurated with chloroform, filtered and dried. Yield 81 percent.

The polymer produced is believed to have the formula:

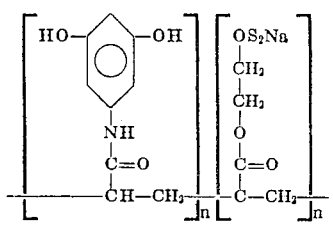

Eq. wgt. 411.4 wherein n is a positive integer.

EXAMPLE 2:

Evaluation of compounds with respect to their effectiveness in scavenging oxidized developing agents is carried out in a photographic system as follows:
Element A:
1. support;
2. silver halide layer containing 110 mg./ft.$^2$ gelatin, 43.5 mg./ft.$^2$ tricresyl phosphate, 87 mg./ft.$^2$ of Br and a silver halide emulsion at 87 mg./ft.$^2$ of silver;
3. layer containing 100 mg./ft.$^2$ gelatin, 20 mg./ft.$^2$ Br and 10 mg./ft.$^2$ of tricresyl phosphate;
4. layer containing 107 mg./ft.$^2$ of gelatin, the scavenger of Table 1 and 4.8 mg./ft.$^2$ of NiS;
5. layer containing gelatin at 50 mg./ft.$^2$.

PROCESSING SOLUTION:

5.1 g. of 4-amino-3-methoxy-N-ethyl-N-$\beta$-hydroxyethylanilane, 0.8 g. of piperidinohexosereductone, 5.0 g. of hypo and 11.8 mg. of NaOH per liter of water

ELEMENT B:

1. support;
2. layer containing 454 mg. of gelatin/ft.$^2$;
3. layer containing 208 mg. of gelatin/ft.$^2$, 173 mg./ft.$^2$ of Coupler No. 1 of U.S. Pat. No. 2,474,293, 86.5 mg./ft.$^2$ of tricresyl phosphate and 2.4 mg./ft.$^2$ of Pd nuclei.

The light-sensitive Element A is exposed through the support to a graduated-density test object and presoaked for 5 seconds at a temperature of 22° C. in the above processing solution. The receiver B is presoaked for 25 seconds in the same solution and subsequently is brought into contact with the light-sensitive element. Both are passed between rubber rollers and left in contact for 3 minutes. Upon separation and drying of the two components, the receiver is analyzed for silver in the areas corresponding to minimum exposure in the negative. Cyan dye density developed in the receiver and the level of silver found in the receiver are both indications of the efficiency of consumption of oxidized developer by the nucleated layer of the negative (the lower the silver and dye densities in the receiving element, the better the efficiency of the oxidized developer scavenger). Maximum efficiency of this layer should promote complete physical development of all complexed silver reacting in the nuclei layer and should consume all oxidized developer generated in the layer.

The following compounds are evaluated by incorporating them in the element as indicated and by processing the exposed element in the described manner. Concentrations of the incorporated compounds and the effectiveness of the compounds as scavengers for oxidized developers are shown in Table 1 below.

| Cpd. No. 1 | Copolymer of Example 1:C |
| --- | --- |
| Cpd. No. I (control) | OH, CH$_3$, H$_3$C—⌬—CH$_2$N—C$_8$H$_{17}$-n |
| Cpd. No. II (control) | OH, CH$_3$, H$_3$C—⌬—CH$_2$N—C$_{18}$H$_{37}$-n |
| Cpd. No. III (control) | OH, H$_3$C—⌬—CONHC$_{18}$H$_{37}$ |
| Cpd. No. IV (control) | OH, H$_5$C$_6$—⌬—CH$_2$—N⌬O |
| Cpd. No. V (control) | OH, t-H$_9$C$_4$—⌬—C$_4$H$_9$-t |
| Cpd. No. VI (control) | OH, n-H$_7$C$_3$—⌬—C$_3$H$_7$-n |
| Cpd. No. VII (control) | OH, H$_3$CNHCH$_2$—⌬—C$_{18}$H$_{37}$-sec, OH |

TABLE 1

| Cpd. No. | mg./ft.$^2$ in Layer 3* | mg./ft.$^2$ Ag in Receiver | Appearance of Dye in Receiver |
| --- | --- | --- | --- |
| 1 | 70 | 2.2 | pale green |
|   | 50 | 5.1 | pale green |
| I | 50 | 18.7 | dark green |
|   | 30 | 9.6 | dark green |
|   | 20 | 18.8 | dark green |
| II | 70 | 16.6 | dark green |
| III | 70 | 16.9 | dark green |
| IV | 60 | 20.2 | dark green |
|   | 23 | 20.2 | dark green |
| V | 60 | 18.2 | dark green |
|   | 46 | 16.9 | dark green |
|   | 23 | 17.2 | — |
| VI | 60 | 13.1 | dark green |
|   | 46 | 14.8 | dark green |
|   | 23 | 16.0 | dark green |
| VII | 34 | 7.3 | green |
|   | 17 | 9.7 | green |

Cpd. 1 is incorporated from aqueous solution; Cpds. I–VII are incorporated from ethyl acetate solution.

The results of Table 1 demonstrate the greater effectiveness of the resorcinol-containing polymers of this invention compared with closely related ballasted phenols and ballasted hydroquinones. The low amount of silver in the receiver is certainly indicative of the effectiveness of the resorcinol-containing polymer for scavenging oxidized developer.

EXAMPLE 3:

The monomer 5-acrylamidoresorcinol (.01 mole), 1.0 g. sodium dodecylsulfate in 20 cc. $H_2O$ and 1.43 ml. (.01 mole) of butyl acrylate are warmed with stirring under nitrogen to 95° C. To this emulsion are added 0.10 g. ammonium persulfate and 0.05 g. sodium bisulfite, both dissolved in 5 cc. water. The reaction mixture is heated for 1.2 hours at 95° C. under nitrogen. The latex is cooled to room temperature, neutralized with dilute sodium hydroxide and filtered. Yield 86 percent.

EXAMPLE 4:

The latex polymer of Example 3 is incorporated in the element of Example 2 from an aqueous dispersion and tested as described with improvements in scavenging oxidized developer similar to those obtained with Compound 1.

Although the invention has been described in considerable detail with particular reference to certain preferred embodiments thereof, variations and modifications can be effected within the spirit and scope of the invention.

I claim:

1. A photographic element comprising a support, at least one layer thereon being an image-receiving layer or containing a silver halide emulsion, and at least one layer thereon containing a polymer having resorcinol groups appended thereto.

2. A photographic element according to claim 1 wherein said polymer contains resorcinol groups having hydroxy substituents in the 1- and 3-position and the resorcinol is attached to the polymer through the 5-position.

3. A photographic element according to claim 1 wherein said photographic element comprises from about 5 mg. to about 100 mg. per square foot of said polymer.

4. A photographic element according to claim 1 wherein said photographic element comprises at least one layer containing a silver halide emulsion.

5. A photographic element according to claim 1 wherein said photographic element comprises at least one layer containing a photographic color-forming coupler.

6. A photographic element according to claim 1 wherein said polymer comprises units represented by the formula:

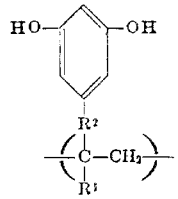

wherein $R^1$ is a hydrogen atom or an alkyl group containing from 1 to 4 carbon atoms, and $R^2$ is a divalent organic group containing from 1 to 8 carbon atoms.

7. A photographic element according to claim 1 wherein said polymer is a water-soluble polymer or a latex polymer.

8. A photographic element according to claim 6 wherein said polymer is a copolymer comprising units represented by the formula in copolymerized relationship with units of at least one other ethylenically unsaturated monomer.

9. A photographic element according to claim 1 which comprises at least one layer containing a silver halide emulsion having associated therewith a photographic color coupler.

10. In a photographic film unit which is adapted to be processed by passing said unit between a pair of juxtaposed pressure-applying members comprising:

a. a photosensitive element comprising a support having thereon at least one photosensitive silver halide emulsion layer, each said silver halide emulsion layer having associated therewith a nondiffusible coupler capable of reacting with oxidized aromatic primary amino color-developing agent to produce a diffusible dye;

b. a dye image-receiving layer; and c. a rupturable container containing an alkaline processing composition and which is adapted to be positioned during processing of said film unit so that a compressive force applied to said container by said pressure-applying members will effect a discharge of the container's contents within said film unit;

said film unit containing an aromatic primary amino color-developing agent, the improvement comprising employing in said element a developing agent scavenger comprising a polymer having resorcinol groups appended thereto.

11. The film unit of claim 10 wherein said dye imagereceiving layer is located on a separate support to be superposed on said photosensitive element and said developing agent scavenger is located between said support and said image-receiving layer.

12. The film unit of claim 10 which contains a timing layer between said scavenger layer and said dye image-receiving layer.

13. The film unit of claim 10 which also contains a pH-lowering material.

14. The film unit according to claim 10 wherein said polymer comprises ethenic units having resorcinol groups appended thereto and units of at least one other ethylenically unsaturated monomer having water-solubilizing groups thereon.

15. In a process of forming a transfer image comprising:

a imagewise-exposing a photosensitive element comprising a support having thereon at least one photosensitive silver halide emulsion layer, each said silver halide emulsion layer having associated therewith a nondiffusible coupler capable of reacting with oxidized aromatic primary amino color-developing agent to produce a diffusible dye;

b treating the layer outermost from the support of said photosensitive element with an alkaline processing composition to effect development of each of said exposed silver halide emulsion layers with an aromatic primary amino color-developing agent;

c forming an imagewise distribution of diffusible dye image-providing material as a function of said imagewise exposure of each said silver halide emulsion layer; and d at least a portion of each said imagewise distribution of diffusible dye image-providing material diffusing to a dye image-receiving layer;

the improvement comprising employing in said film unit a developing agent scavenger layer comprising a polymer having resorcinol groups appended thereto.

* * * * *

UNITED STATES PATENT OFFICE
CERTIFICATE OF CORRECTION

Patent No. 3,772,014                     Dated November 13, 1973

Inventor(s) Peter William Scullard

It is certified that error appears in the above-identified patent and that said Letters Patent are hereby corrected as shown below:

Column 8, line 20, "celluslose" should read --cellulose--. Column 9, lines 11-12, that part of formula reading:

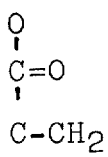      should read      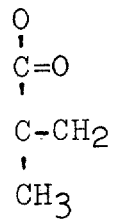

Column 10, lines 57-59, that part of table for Compound IV reading:

|     |    |      |            |
| --- | -- | ---- | ---------- |
| IV  | 60 | 20.2 | dark green |
|     | 23 | 20.2 | dark green | should read

|     |    |      |            |
| --- | -- | ---- | ---------- |
| IV  | 60 | 20.2 | dark green |
|     | 46 | 19.7 | dark green |
|     | 23 | 20.2 | dark green | line 65, before "Cpd.", --*-- should be inserted.

Signed and sealed this 20th day of August 1974.

(SEAL)
Attest:

McCOY M. GIBSON, JR.
Attesting Officer

C. MARSHALL DANN
Commissioner of Patents